United States Patent [19]

Besso et al.

[11] 4,066,623

[45] Jan. 3, 1978

[54] INVERSE INTERFACIAL POLYMERIZATION FOR PREPARING CERTAIN HALOGENATED AROMATIC POLYESTERS

[75] Inventors: Michael M. Besso, West Orange; Lowell Saferstein, Edison, both of N.J.

[73] Assignee: Celanese Corporation, New York, N.Y.

[21] Appl. No.: 735,648

[22] Filed: Oct. 26, 1976

[51] Int. Cl.$^2$ .................... C08G 63/18; C08G 63/24; C08G 63/68
[52] U.S. Cl. .......................... 260/47 C; 260/DIG. 24
[58] Field of Search ................ 260/47 C, 61, DIG. 24

[56] References Cited

U.S. PATENT DOCUMENTS 3,234,167  2/1966  Sweeny .............................. 260/30.4

*Primary Examiner*—Lester L. Lee

[57] ABSTRACT

The present invention relates to a process for preparing certain halogenated aromatic polyesters by an inverse interfacial polymerization technique. More specifically, the present invention offers a method for substantially reducing the amount of low molecular weight fraction which accompanies the formation of these polyesters when prepared by standard interfacial polymerization techniques by (1) inverting the order of addition of one phase to the other, i.e. by adding the aqueous phase to the organic phase, (2) controlling the rate of addition of the aqueous phase to the organic phase and (3) adding the catalyst to the organic phase prior to the addition of the aqueous phase thereto.

23 Claims, No Drawings

INVERSE INTERFACIAL POLYMERIZATION FOR PREPARING CERTAIN HALOGENATED AROMATIC POLYESTERS

BACKGROUND OF THE INVENTION

Halogenated aromatic polyesters based on bisphenols may be prepared by interfacial polymerization techniques. In accordance with typical interfacial polymerization procedure of the prior art, the reactants are present in different liquid phases which are immiscible and which, in the preparation of these polymers, constitute two solvent media. Thus, a bisphenol is dissolved in one solvent medium, and an aromatic diacylhalide is dissolved in a second solvent medium immiscible with the first. Any necessary catalyst such as quaternary ammonium salt or phosphonium salt is generally added to the aqueous phase. The organic phase is then rapidly added to the aqueous phase with vigorous agitation.

Although it is preferred to add the organic phase containing the mixture of acid chlorides to the aqueous phase containing the bisphenol in the interfacial polymerization procedures of the prior art, it has also been recognized that the polymerization may be carried out by inverting the order of addition of reactants and adding the aqueous phase to the organic phase. (See U.S. Pat. Nos. 3,274,290 and 3,278,640, as well as U.S. patent application Ser. No. 686,190, filed May 13, 1976.) In either case, however, both phases are *rapidly* combined with vigorous agitation regardless of the order of addition. Thus, the prior art techniques fail to suggest a slow, controlled rate of addition of the aqueous phase to the organic phase and the advantages which result therefrom when carried out in accordance with the presently claimed invention.

In the past it has been very difficult to obtain by interfacial polymerization, polyesters of the type described herein which possess the high molecular weights required in fiber spinning techniques. Thus, the procedures and techniques of the prior art have relied upon catalysts such as those disclosed in U.S. Pat. No. 3,100,698 and U.S. Pat. No. 3,234,167 to achieve and ensure high molecular weight products. It has been standard procedure to add the catalyst to the aqueous phase prior to mixing with the organic phase. Alternative and less preferred methods of utilizing the catalyst include adding the catalyst to the reaction mixture initially or during the course of polymerization or alternatively adding it intermittently during the reaction. However, the procedures of the prior art fail to suggest the addition of the catalyst to the organic phase prior to the addition of the aqueous phase thereto and the advantages which result therefrom when utilized in accordance with the present invention.

It has been observed that certain halogenated aromatic polyesters of the type defined herein will evidence a bimodal molecular weight distribution and will therefore substantially always possess a low molecular weight fraction comprising a substantial portion of the total polymer (e.g., about 15 to 20% by weight) when prepared by the above described interfacial polymerization processes of the prior art. The presence of the low molecular weight fraction (e.g., that portion of the polymer having molecular weight not greater than about 8000) gives rise to certain properties, such as, poor solvent resistance, which become undesirable in certain environments such as dry cleaning and/or dyeing operations.

The present invention offers a method for substantially reducing the amount of low molecular weight fraction which accompanies the formation of certain halogenated aromatic polyesters prepared by the standard interfacial polymerization (1) by inverting the order of addition of one phase to the other, i.e., by adding the aqueous phase to the organic phase, (2) by controlling the rate of addition of the aqueous phase to the organic phase and (3) by adding the catalyst to the organic phase prior to the addition of the aqueous phase thereto. The halogenated aromatic polyesters prepared in accordance with the presently claimed invention possess a molecular weight distribution similar to that obtainable from a solution polymerization technique at a substantial savings in cost.

Interfacial polymerization is more economically favorable than the solution polymerization technique because of the former technique's ability to utilize less expensive bases such as sodium hydroxide as an acid acceptor rather than the more expensive triethylamine required in the latter process. The use of such bases as triethylamine necessitates additional removal and recycle steps to collect and conserve the expensive compounds thereby further increasing the cost of the process. In contrast, polyesters prepared by interfacial polymerization are easily washable. Further advantages of the present invention include shorter reaction times than those utilized in solution polymerization as well as the ability to use water as a portion of the reaction mixture which reduces the quantity of organic solvents from that utilized in solution polymerization thereby also reducing solvent recovery costs.

It is therefore an object of the presently claimed invention to provide a relatively inexpensive process for the preparation of high molecular weight halogenated aromatic polyesters of the type disclosed which possess a narrow molecular weight distribution.

These and other objects as well as the scope, nature and utilization of the invention will be apparent to those skilled in the art from the following description and appended claims.

SUMMARY OF THE INVENTION

In one aspect of the presently claimed invention there is provided a process for preparing a halogenated aromatic polyester of the recurring structural formula

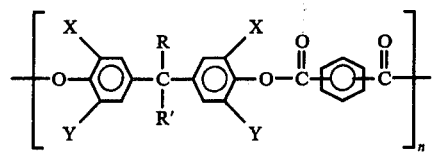

where X which may be the same or different is chlorine or bromine, Y which may be the same or different is hydrogen, chlorine or bromine, R and R' may be the same or different and represent lower alkyl groups, hydrogen, or together constitute a cyclic hydrocarbon group, and n equals at least 13, by the inverse interfacial polymerization of a halogenated bisphenol and isophthaloyl chloride, terephthaloyl chloride or mixtures thereof which comprises:

I. providing an organic phase comprising
   a. an organic solvent,
   b. a phthaloyl chloride or mixtures thereof, and
   c. a catalytic amount of a phase transfer catalyst;

II. providing an aqueous phase comprising
   a. an aqueous solvent immiscible with said organic solvent and capable of dissolving an alkali salt of said halogenated bisphenol,
   b. an alkali salt of said halogenated bisphenol, and
   c. a base in amounts sufficient to provide a pH of at least 8 in said aqueous solution,
III. gradually adding the aqueous phase to the organic phase over a period of time not less than about 20% of the total polymerization time and in a manner sufficient to sustain the uniform availability of phase transfer catalyst for reaction with the alkali salt of the bisphenol during the polymerization reaction thereby providing a polyester having a low molecular weight fraction of not greater than about 3% by weight of the polyester;
IV. recovering the polyester from the organic phase.

DESCRIPTION OF PREFERRED EMBODIMENTS

The halogenated aromatic polyester prepared in accordance with the process of this invention has recurring units of the structural formula:

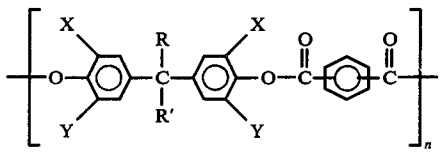

where X which may be the same or different is chlorine or bromine, Y which may be the same or different is hydrogen, chlorine, or bromine, R and R' may be the same or different and represent lower alkyl groups (e.g., 1 to 5 carbon atoms), hydrogen, or together constitute a cyclic hydrocarbon group and $n$ equals at least 13 (e.g., $n$ equals about 40 to 400). Commonly the aromatic polyester utilized in accordance with the process of this invention has a chlorine and/or bromine content of about 15% to 60% by weight based upon the weight of the aromatic polyester, (e.g., a chlorine and/or bromine content of about 25% to 50% by weight). As is apparent from the structural formula, the aromatic polyester is chlorinated and/or brominated in the sense that these substituents are directly attached to an aromatic ring. Preferably the halogen substituents are all bromine.

The halogenated aromatic polyesters conforming to the above-defined formula are prepared from a reaction mixture comprising substantially equimolar amounts of (1) an appropriate bisphenol and (2) isophthaloyl chloride, terephthaloyl chloride, or mixtures thereof by inverse interfacial polymerization.

The reactants are present in different liquid phases which are immiscible and which, in the preparation of the present polymers, constitute two solvent media. The halogenated bisphenol is dissolved in one solvent medium while the acid chloride or mixtures thereof is dissolved in a second solvent medium immiscible with the first.

An organic solvent is utilized in preparing the organic phase for the acid chloride or mixtures thereof, said organic solvent being so chosen that it exerts a solvating effect on the polymer produced, either dissolving it completely or serving as a swelling medium. Thus, although the solvent must be capable of preventing precipitation before high molecular weight has been obtained, it need not dissolve the final polymer.

Solvents which are capable or almost capable of dissolving the final polymer yield polymers having a higher molecular weight than those which are not. The common organic solvents immiscible with water and inert to any reactive intermediates are suitable for purposes of the presently claimed invention. Chlorinated hydrocarbons and aromatic hydrocarbons are particularly useful. Typical of such solvents are methylene chloride, tetrachloroethylene, aromatic solvents such as benzene, chlorobenzene, xylene, o-dichlorobenzene, bromobenzene, nitrobenzene, anisole, acetophene, ethers such as ethyl ether, isopropyl ether, and mixtures thereof. Solvents having acid groups, hydroxyl groups, and amine groups should be avoided as well as those solvents which dissolve appreciable amounts of water.

It will be noted that the halogenated aromatic polyesters of this invention are prepared by the condensation of bisphenols with the diacid halides of isophthalic acid, terephthalic acid or mixtures thereof. The use of a diacid halide as opposed to other corresponding derivatives is critical, the direct preparation of polymers from bisphenols and free acids being normally not possible. These acid halides may be derived from a corresponding dicarboxylic acid by any one of several methods well known in the art such as reacting the respective acids with thionyl chloride.

In preparing a preferred brominated aromatic polyester, the organic phase will preferably contain an aromatic acid chloride mixture of about 40 to 80% (e.g., 60%) by weight isophthaloyl chloride and correspondingly about 60 to 20% (e.g., 40%) by weight terephthaloyl chloride.

In preparing a preferred chlorinated aromatic polyester, the organic phase will preferably contain an aromatic acid chloride mixture of about 90 to 40%, and preferably about 80 to 60% (e.g., 70%) by weight isophthaloyl chloride and correspondingly about 10 to 60%, and preferably from about 20 to 40% (e.g., 30%) by weight terephthaloyl chloride.

The addition of a phase transfer organic catalyst is useful in promoting higher molecular weights and it is necessary to use such a catalyst in the practice of the presently claimed invention in order to achieve polyesters of the type defined herein which possess an intrinsic viscosity of the order described.

Suitable phase transfer catalysts (also referred to as accelerators) for the reverse interfacial polymerization of the presently claimed process include quaternary ammonium salts (e.g., tetraethylammonium chloride, benzyltrimethylammonium chloride) and phosphonium salts. Other representative phase transfer catalysts suitable for use in the presently claimed invention include tertiary amines including triethylamine, tri-n-butylamine, dimethylcyclohexylamine; quaternary ammonium salts including tetramethylammonium bromide, tetraethylammonium bromide, tetra-n-butylammonium iodide, trimethylcetylammonium bromide, trimethylbenzylammonium chloride, triethylbenzylammonium chloride, dimethylbenzylphenylammonium chloride, dimethylbenzylstearylammonium chloride, quaternary arsonium salts including methyltriphenylarsonium iodide, benzyltriphenylarsonium iodide, benzyltriphenylarsonium bromide, benzyltriphenylarsonium chloride, tetraphenylarsonium chloride; quaternary phosphonium salts including tetrabutylphosphonium iodide, methyltriphenylphosphonium chloride, methyltriphenylphosphonium iodide, hydroxyethyltriphenylphosphonium chloride, benzytriphenylphosphonium chloride, p-xylylene-α,α'-bis(triphenylphosphonium chloride); tertiary sulfonium salts including dimethyl-2-hydroxyphenylsufonium chloride, dimethyl-3,5-dihydroxyphenylsufonium chloride, tribenzylsulfonium hydrogen sulfate, hexamethylene-1,6-bis (dimethylsulfonium bromide) and p-xylylene-α,α'-bis(dihydroxyethylsulfonium bromide).

The phase transfer catalyst is added initially to the organic phase before mixing the two phases. Although benzyltriethylammonium chloride is a particularly effective phase transfer catalyst, other quaternary salts and suitable amines as described above are also effective.

A catalytic amount of phase transfer catalyst may vary from about .01 to about 50%, preferably from about 0.01 to about 0.5%, and most preferably from about 0.05 to about 0.2% by weight of the monomer reactants present in the organic phase.

The bisphenols which are useful in the preparation of the polyesters having recurring units of the formula illustrated above have the structure:

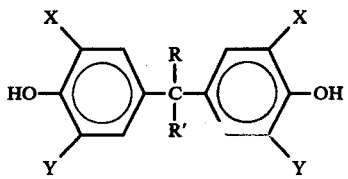

where X, Y, R, and R', have the same significance as set forth hereinabove. Suitable bisphenols which are useful in the practice of this invention include 4,4'-methylene-2,2'-6,6'-tetrabromodiphenol; 4,4'-ethylidene-2,2',6,6'-tetrabromodiphenol; 4,4'-isopropylidene-2,2'-6,6'-tetrachlorodiphenol (i.e., tetrachlorobisphenol A); 2,2-bis(3-chloro 4-hydroxy phenyl) propane; 2,2-bis(3-bromo 4-hydroxy phenyl) propane; 1,1-bis(5-bromo 4-hydroxy phenyl) ethane; 1,1-bis(5-chloro 4-hydroxy phenyl) ethane; 2,2-bis(3chloro 5-bromo 4-hydroxy phenyl) propane; bis(3-chloro 4-hydroxy phenyl) methane; bis(3,5-dichloro 4-hydroxy phenyl) methane; 1,1-bis(3,5-dichloro 4-hydroxy phenyl) ethane; as well as their alkali metal salts.

Preferred bisphenols useful in the practice of this invention are 4,4'-isopropylidene-2,2',6,6'-tetrabromodiphenol also known as tetrabromobisphenol A and 4,4'-isopropylidene-2,2'-6,6'tetrachlorodiphenol also known as tetrachlorobisphenol A.

Many brominated bisphenols of the above-described structure are commercially available and may be prepared by the condensation of a lower alkyl ketone or aldehyde with two molecules of the phenol and subsequently brominating and/or chlorinating the unsubstituted phenol. This reaction is usually carried out with or without an inert solvent in the presence of an acid. This reaction is summarized in the case of X and Y being bromide in the following equations wherein R and R' have the meanings hereinabove described.

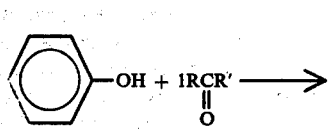

(1)

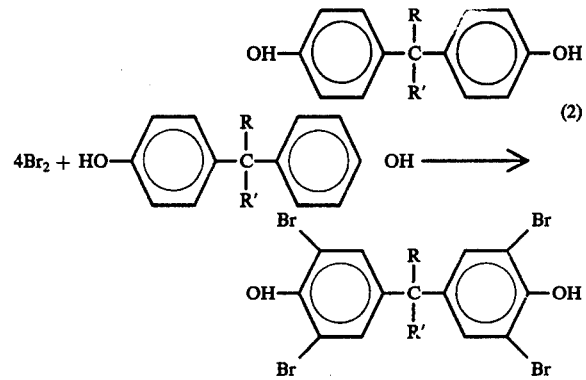

(2)

The appropriate bisphenol is dissolved in an aqueous alkaline solution and thereby converted to its corresponding alkali salt. Preferably sodium or potassium hydroxide may be utilized to prepare the alkaline aqueous phase.

Other suitable bases which may be utilized to provide the alkaline aqueous solution include lithium hydroxide, the alkaline earth hydroxides (e.g., calcium hydroxide) as well as any other source of hydroxyl ions which does not adversely affect the polymerization reaction.

Such bases are employed in amounts which are sufficient to provide the aqueous phase with a pH of at least 8.

The aqueous phase may comprise a 1 mole portion of the halogenated bisphenol described herein dissolved in from 2 to 50 times its weight in water.

In preparing the aqueous and organic phases it is preferred that the weight ratio of organic solvent, such as methylene chloride, to aqueous solvent constitute from about 1.3 to about 1 to achieve good phase separation.

For smooth operation in a stirred interfacial polymerization, the resulting polymer product preferably should be about 5% or less on the basis of combined weights of water and organic solvent although percentages as high as 10% may be utilized depending on the molecular weights of the polymer. At concentrations of about 10% the organic phase may be highly viscous and while possibly causing some agitation problems such concentrations may provide for easier separation of the resulting polymer from the reaction mixture and easier concentration of the resulting polymer to a suitable solids content (e.g., 20%) in the organic phase for spinning.

Generally, substantially stoichiometric amounts of each reactant are employed; typically molar amounts of from 1:0.8:0.2 to about 1:0.2:0.8, of the ratio of bisphenol, isophthaloyl chloride and terephthaloyl chloride, respectively are utilized.

Once the solutions comprising the aqueous phase and organic phase are prepared, the aqueous phase is gradually added to the organic phase at a controlled rate. In order to determine the rate of addition, it is important that the mechanism by which the reverse interfacial polymerization operates be understood. A summary of the reaction mechanisms involved is provided below.

I. Conventional Interfacial Polymerization

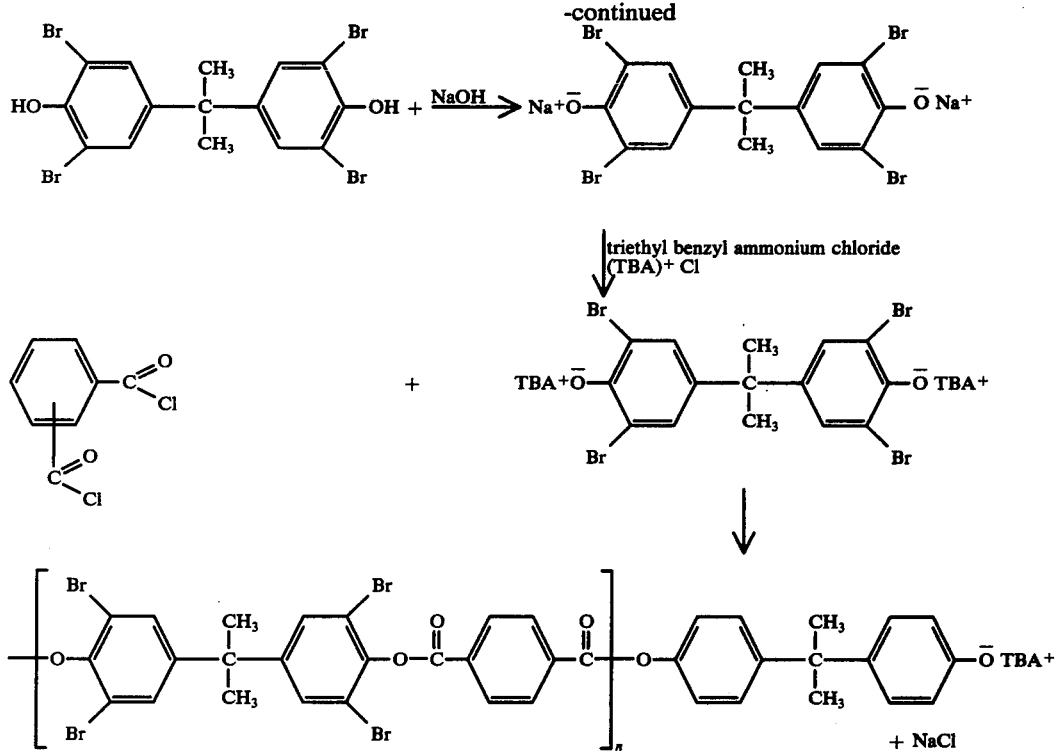

II. Inverse Interfacial Polymerization

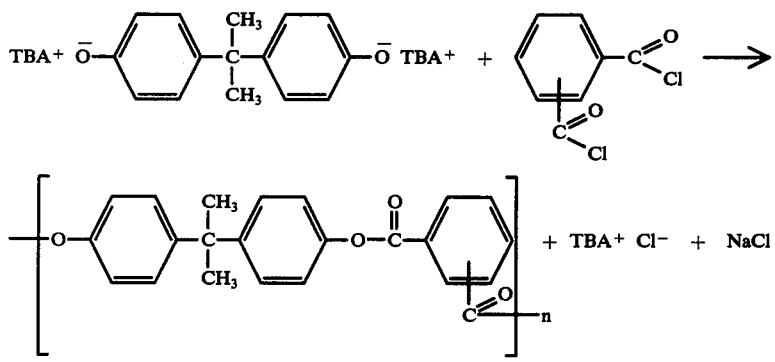

In the more conventional interfacial polymerization of an aromatic polyester, the bisphenol is dissolved in an alkaline aqueous solution of sodium or potassium hydroxide to form the corresponding alkaline salt of the bisphenol. The phase transfer catalyst is added to this aqueous solution and an exchange reaction takes place converting the alkaline salt to a tetra-alkyl ammonium phenoxide salt, (i.e. when the catalyst is a quaternary ammonium salt).

The tetra-alkyl ammonium phenoxide salt, unlike the alkali salt of the bisphenol, is soluble in organic solvents and thus, when the organic phase containing the diacid chloride is added all at one time, it reacts in the organic phase with the acid chloride giving in the early part of the polymerization a low molecular weight polyester in the organic phase capped with tetra-alkyl ammonium phenoxide. The aqueous phase is therefore rapidly depleted of phase transfer catalyst and the monomer remaining in the aqueous phase in the form of the alkali salt (instead of the tetra-alkyl ammonium phenoxide salt), reacts with the acid chloride at the interface with a kinetic rate different (i.e., slower) from the solution polymerization. Thus, two rates of reaction are occurring in the beginning of the polymerization process giving rise to two different molecular weight distributions which may be characterized as a low molecular weight fraction and a high molecular weight fraction.

The phrase "low molecular weight fraction" is intended to describe that portion of the halogenated aromatic polyester of the type described herein which has a molecular weight of less than about 8,000, or alternatively, wherein $n$ of the recurring structural formula has an average value of less than about 13.

In the inverse interfacial polymerization, the alkaline aqueous solution of the alkali salt of the bisphenol is added at a controlled rate to the acid chloride dissolved in the organic solvent contaning the phase transfer catalyst. In addition, the organic phase is maintained under conditions of agitation sufficient to uniformly disperse the aqueous phase substantially throughout the organic phase. It is believed that when the aqueous solution is slowly added to the orgaic phase, the phase transfer catalyst migrates into the aqueoue phase which is relatively uniformly dispersed, exchanges with the cation of the alkali salt and brings the resulting phenoxide salt into the organic phase where it reacts with the excess acid chloride and end caps the growing polymer chain with acid chloride groups. Thus, the phase transfer catalyst is liberated and is free to bring more bisphenol into the organic phase. Since the phase transfer catalyst is not tied up at the ends of the growing polymer chain, the degree of interfacial polymerization which occurs, at a second lower rate and as a result of the initial reduction in the amount of the free catalyst, is reduced and substantially all of the polymerization takes place as a true solution polymerization with essentially one rate constant. Accordingly, in the inverse interfacial polymerization, the molecular weight distribution is similar to that obtained by solution polymerization.

It can therefore be seen that a reduction in the extent of the second reaction responsible for the low molecular weight polymer fraction is contingent on the uniform availability of free catalyst from the organic phase during the entire polymerization process which in turn is achieved by providing, under conditions of vigorous agitation, an initially large excess of acid chloride with respect to the alkali salt of the bisphenol in the reaction mixture as a whole.

Such excess is achieved automatically by reversing the order of addition of reactants and slowly adding the aqueous phase to the organic phase. Thus, the bisphenol salt concentration is maintained at a very low level at the beginning of the polymerization process since the bisphenol salt is reacted with the excess acid chloride almost as fast as it is added while toward the end of the addition most of the bisphenol salt has already been substantially reacted with the acid chloride and there remains only a relatively low concentration thereof which is also insufficient to reduce the availability of the phase transfer catalyst in the manner described. The rate of addition of the bisphenol salt may therefore exceed the rate of polymerization reaction to a certain degree and still preserve the balance of excess acid chloride necessary to achieve the substantial elimination of a bimodal molecular weight distribution. If the rate of addition is substantially uniform, it is possible to express the amount of alkali bisphenol salt per unit time which must be added to the reaction mixture as a percentage of the total polymerization time during which the reaction takes place.

By "total polymerization time" is meant the period beginning from the first addition of the aqueous phase, containing the salt of the bisphenol, to the organic phase, containing the acid chloride and catalyst, and continuing until the resulting halogenated aromatic polyester has attained the desired intrinsic viscosity, and the reaction is terminated. Thus, the "total polymerization time" includes both stirring time, if any, (i.e., that period subsequent to completion of the addition of the aqueous phase to the organic phase during which agitation of the reaction mixture continues while under polymerization conditions), as well as the actual addition time during which the one phase is added to the other also under conditions of agitation.

Generally, when all of the aqueous phase has been added to the organic phase the reaction mixture may be stirred for varying periods depending on the molecular weight desired. Typical stirring times may vary from about 1 to 2 hours (e.g., about 1 to 1.5 hours).

The word "uniform" as used in the phrase "uniform rate of addition" is meant to include both continuous and intermittent modes of addition which may be characterized as establishing a pattern, e.g., preferably a repetitive pattern. This pattern should be capable of describing the "rate of addition" as it exists at any point in time during which the addition in taking place.

The word "rate" as used in the phrase "uniform rate of addition" is meant to express the relationship between the amount of alkali salt of the bisphenol contained in the aqueous phase added to the organic phase and the period of time during which this addition takes place (e.g., moles of bisphenol salt per minute).

The phrase "uniform rate of addition" is meant to exclude rates of addition of the alkali salt of the bisphenol to the organic phase which would reduce the availability of the phase transfer catalyst for reaction in the manner described at any time during the polymerization reaction, e.g., by adding the entire aqueous phase to the organic pase in one increment.

Commonly the "total polymerization time" will vary from about .25 to about 3.0 hours, preferably from about 0.5 to about 1.5 hours and most preferably from about 0.5 to about 1 hour, depending upon the reactivity of the reactants, speed and type of stirring, purity of the solvent and the molecular weight desired.

At a uniform rate of addition, the alkali salt of the bisphenol may be added for a period of time of not less than about 20% of the total polymerization time. Preferably, however, said alkali salt may be added at a uniform rate over a period of about 20 to about 50% (e.g., 20 to 30%) of the total polymerization time.

More specifically, the alkali salt of the bisphenol may be added at a rate of about 1.0 mole percent/minute, preferably about 5.0 mole percent/minute and most preferably about 3.0 mole percent/minute based on the total number of moles of alkali salt of the bisphenol originally present in the aqueous phase before mixing.

Condensation is effected at temperatures which may vary from about 0° C to about 70° C, preferably from about 15° C to about 40° C.

The polymer-forming reaction may be carried out in a continuous manner, by which the reactants are continuously introduced into the reaction zone and the polymeric product is continuously prepared and withdrawn. This may be achieved for example by utilizing a cylindrical tube, having static mixers, as the reaction vessel. The organic phase is passed through the tube while adding the aqueous phase at various points along the longitudinal axis.

Agitation of the reactants must be sufficient to evenly disperse the aqueous phase throughout the organic phase to avoid a build-up of the concentration of the aqueous phase in a localized area within the reaction mixture. Such agitation may be supplied by any of the standard means of mixing such as by a stirrer, shaker, static mixer, spray nozzle or other flow agitation systems. The polymerization may also be accomplished in a batch process in which stoichiometric amounts of the reactants are introduced in the manner described into a reaction vessel wherein condensation polymerization is effected, and the product isolated.

The reaction mixture is preferably strirred vigorously for varying periods of time as defined above, and the polyester polymer is recovered from the organic phase. Such recovery may be achieved by precipitating or coagulating the polymer from the mixture by any suitable means, as for example, by addition to a non-solvent such as isopropyl alcohol to the reaction mixture containing both phases. The precipitated polymers are generally washed prior to precipitation to remove any residual impurities.

Alternatively and preferably, the polymer solution containing the polyester may be separated from the aqueous solution, washed with water to remove salts, dried, concentrated to the desired spinning dope viscosity or diluted without isolation if the polymer is a solid, and thereafter processed for shaping, e.g., spun or cast for making fibers or films, respectively.

Generally the interfacial polymerization reaction is conducted so as to obtain an aromatic polyester having an intrinsic viscosity (I.V.) which may vary from about 0.4 to about 1.7, preferably from about 0.6 to about 1.5, most preferably from about 0.8 to about 1.2. The most preferred range may be utilized when the polymer is intended for use in spinning operations. The intrinsic viscosity is determined by measuring the relative viscosity of a 0.1% solution of the polymer at 25° C in a suitable solvent, such as chloroform or a 10/7 (w/w) mixture of phenol/trichlorophenol. The viscosity of the polymer solution is measured relative to the solvent alone and the intrinsic viscosity (I.V.) is determined from the following equation:

$$I.V. = \frac{\ln \frac{V_2}{V_1}}{C}$$

In the above formula, $V_2$ is the efflux time of the solution, $V_1$ is the efflux time of the solvent, and $C$ is the concentration expressed in grams of polymer per hundred milliliters of solution. As is known in the polymer art, intrinsic viscosity is monotonically related to the molecular weight of the polymer.

The aromatic polyesters prepared by the process of the presently claimed invention may be dissolved in a suitable spinning or casting solvent, such as methylene chloride or tetrahydrofuran and formed into a shaped article, such as a fiber, filament or film.

Polyesters having a relatively high molecular weight with a narrow molecular weight distribution are especially suited for fiber applications. Thus, a dope prepared from such polymers is easier to spin and draw, the physical property values such as strength and elongation of the fibers are improved, and the absence of a low molecular weight fraction substantially reduces the ability of dry cleaning and dyeing solvents to extract material from the fibers.

The halogenated aromatic polyesters described herein which are prepared in accordance with the presently claimed invention possess a low molecular weight fraction, as defined herein, of about 3% or less by weight of the total weight of the polyester.

The percentage of the low molecular weight fraction present in the resulting halogenated aromatic polyester may be determined by standard gel permeation chromatography techniques. For example, a 0.1% solution of polystyrene in tetrahydrofuran (THF) is prepared and utilized to calibrate a Styragel column by plotting the log molecular size (of the polystyrene) vs. elution volume.

A sample solution containing 0.040 grams of halogenated aromatic polyester to be tested dissolved in 20 ml of tetrahydrofuran is then prepared and chromatographed at 30° C on the previously calibrated Styragel column. The polystyrene equivalent molecular weight parameters may be determined from the calibration curves of the log of the polystyrene molecular size in angstroms. These parameters may in turn be utilized to calculate the molecular weight distribution as well as the percentage of the low molecular weight fraction relative to total molecular weight of the polymer as expressed by the total chromatogram.

The halogenated aromatic polyesters described herein have been used to produce a number of inherently non-burning fibrous materials which offer the public a great degree of fire safety, particularly when fibrous articles are required for use in fire-control environments, e.g., children's sleepwear, suits for fire fighters, hospital furnishings, uniforms for military and civilian flight personnel.

The following examples are given as specific illustrations of the claimed invention. It should be understood, however, that the invention is not limited to the specific details set forth in the examples. All parts and percentages in the examples as well as in the specification and claims are by weight unless otherwise specified.

EXAMPLE I

Preparation of Organic Phase 14.2 grams (0.07 moles) of a 60:40 mixture of isophthaloyl chloride and terephthaloyl chloride are charged into a 1-liter reaction vessel with an overhead stirrer. 320 ml (0.427 grams) of methylene chloride are added to the same reaction vessel and stirred until the acid chlorides are dissolved. Subsequent to the dissolution of the acid chlorides 0.235 grams of triethylbenzyl ammonium chloride (phase transfer catalyst) are added to the reaction vessel.

Preparation of Aqueous Phase 38.0747 (0.07 moles) of 4,4'-isopropylidene-2,2'-6-tetrabromodiphenol (i.e., tetrabromobisphenol A) are added to and dissolved in a vessel containing 318 ml of water and 5.88 grams (0.14 moles) of sodium hydroxide.

Reverse Interfacial Polymerization

The aqueous solution is then placed in a dropping funnel and added to the organic solution under conditions of agitation (i.e., stirring) at the rate of 3.3 mole percent per minute based on the total number of moles of the bisphenol originally utilized to prepare the aqueous phase. This rate may also be expressed as a total addition time of 30 minutes (i.e., at a uniform rate of addition) which corresponds to 33.3% of a total polymerization time of 90 minutes. Upon completion of the addition of the aqueous solution the reaction mixture is stirred for an additional hour. The mixture is then allowed to separate into two layers. The very viscous lower methylene chloride layer contains the polymer and is separate from the upper water layer. The organic layer is washed with distilled water until the water washings give a negative chloride ion test with silver nitrate.

The methylene chloride solution is then added to acetone in an air driven blender to precipitate the polymer.

The polymer is dried at 85° C in a vacuum oven for 16 hours. The aromatic polyester prepared via this inverse addition technique has an intrinsic viscosity of 1.31 dl/g measured in chloroform, a kinematic viscosity of 158 centistoke, and most importantly, a gel permeation chromatogram of this polymer shows a bimodal molecular weight distribution with the lower molecular weigh fraction comprising only 3 percent of the entire weight of the polyester.

EXAMPLE II

The same procedure as described in Example 1 is repeated with the exceptions that 4,4'-isopropylidene-2,2'-6,6'tetrachlorodiphenol (i.e., tetrachlorobisphenol A) is utilized to prepare the aqueous phase instead of tetrabromobisphenol A and that a 70:30 mixture of isophthaloyl and terephthaloyl chloride respectively is utilized in preparing the organic solution instead of the 60:40 ratio.

The results which are substantially the same as Example I, show a bimodal molecular weight distribution having a low molecular weight fraction comprising about 2% of the entire weight of the polymer.

COMPARATIVE EXAMPLE

The same solutions are prepared as described in Example 1 with the exception that the phase transfer catalyst is added to the aqueous solution.

The order of addition is then reversed and the organic phase is added dropwise to the aqueous phase in the same manner as described in Example 1. The intrinsic viscosity and kinematic viscosity of the resulting polymer are similar to the values cited in the example above, and the gel permeation chromatogram again shows a bimodal molecular weight distribution, however, the low molecular weight fraction comprises 15 to 20% weight percent of the entire polymer.

Although the invention has been described with preferred embodiments, it is to be understood that variations and modifications may be resorted to as will be apparent to those skilled in the art. Such variations and modifications are to be considered within the purview and scope of the claims appended hereto.

We claim:

1. A process for preparing a halogenated aromatic polyester of the recurring structural formula

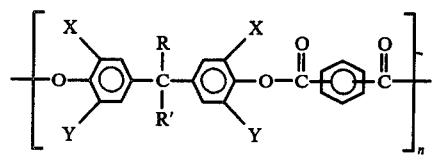

where X which may be the same or different is chlorine or bromine, Y which may be the same or different is hydrogen, chlorine or bromine, R and R' may be the same or different and represent lower alkyl groups, hydrogen, or together constitute a cyclic hydrocarbon group, and n equals at least 13, by the inverse interfacial polymerization of a halogenated bisphenol and isophthaloyl chloride, terephthaloyl chloride or mixtures thereof which comprises:

I. providing an organic phase comprising
  a. an organic solvent,
  b. a phthaloyl chloride or mixtures thereof, and
  c. a catalytic amount of a phase transfer catalyst;
II. providing an aqueous phase comprising
  a. an aqueous solvent immiscible with said organic solvent and capable of dissolving an alkali salt of said halogenated bisphenol,
  b. an alkali salt of said halogenated bisphenol, and
  c. a base in amounts sufficient to provide a pH of at least 8 in said aqueous solution,
III. adding the aqueous phase to the organic phase over a period of time of not less than about 20% of the total polymerization time and in a manner sufficient to sustain the uniform availability of phase transfer catalyst for reaction with the alkali salt of the bisphenol during the polymerization reaction thereby providing a polyester having a low molecular weight fraction of not greater than about 3% by weight of the polyester;
IV. recovering the resulting polyester product.

2. The process according to claim 1 wherein said halogenated aromatic polyester of the recurring structural formula is a product of a tetrabromobisphenol and a mixture of about 40 to 80% by weight isophthaloyl chloride and correspondingly about 60 to about 20% by weight terephthaloyl chloride.

3. The process according to claim 1 wherein said halogenated aromatic polyester of the recurring structural formula is a product of tetrabromobisphenol A and a mixture of about 60% by weight isophthaloyl chloride and correspondingly about 40% by weight terephthaloyl chloride.

4. The process according to claim 1 wherein the aqueous phase is added to the organic phase over a period of time of about 20 to 50% of the total polymerization time.

5. The process according to claim 1 wherein said halogenated aromatic polyester of the recurring structural formula is a product of a tetrachlorobisphenol and a mixture of about 90 to 40% by weight isophthaloyl chloride and correspondingly about 10 to 60% by weight terephthaloyl chloride.

6. The process according to claim 1 wherein said halogenated aromatic polyester of the recurring structural formula is a product of tetrachlorobishpenol A and a mixture of about 70% by weight isophthaloyl chloride and correspondingly about 30% by weight terephthaloyl chloride.

7. The process of claim 1 wherein the phase transfer catalyst is selected from the group consisting of quaternary ammonium salts, quaternary phosphonium salts, quaternary arsonium salts and tertiary sulfonium salts.

8. The process of claim 1 wherein the phase transfer catalyst is benzyltriethylammonium chloride.

9. The process of claim 1 wherein the halogenated aromatic polyester of the recurring structural formula has an intrinsic viscosity of about 0.4 to about 1.7.

10. The process of claim 1 wherein the organic solvent is methylene chloride and the aqueous solvent is water.

11. The process of claim 1 wherein the polyester is recovered from the organic phase by precipitation with a non-solvent medium.

12. A process for preparing a halogenated aromatic polyester of the recurring structural formula

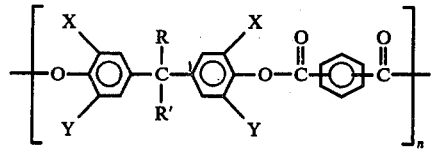

where X which may be the same or different is chlorine or bromine, Y which may be the same or different is hydrogen, chlorine or bromine, R and R' may be the same or different and represent lower alkyl groups, hydrogen, or together constitute a cyclic hydrocarbon group, n equals at least 13, by the inverse interfacial polymerization of a halogenated bisphenol and a mixture of isophthaloyl chloride, and terephthaloyl chloride which comprises:
I. providing an organic phase comprising
  a. an organic solvent,
  b. a mixture of isophthaloyl and terephthaloyl chloride, and
  c. a catalytic amount of a phase transfer catalyst,
II. providing an aqueous phase comprising
  a. water,
  an alkali salt of said halogenated bisphenol, and
  c. a base sufficient to establish a pH of said aqueous phase of at least 8;
III. gradually adding the aqueous phase to organic phase over a period of time of about 20 to 30% of the total polymerization time and in a manner sufficient to provide a stoichmetric excess of acid chloride over the alkali salt of the bisphenol in the reaction mixture during the polymerization said stoichiometric excess being sufficient to sustain the uniform availability of the phase transfer catalyst for reaction with the alkali salt of the bisphenol thereby providing said aromatic polyester with a low molecular weight fraction of not greater than 3% by weight of the total weight of the polyester formed; and
IV. recovering the resulting polyester product.

13. The process according to claim 12 wherein said halogenated aromatic polyester of the recurring structural formula is a product of a tetrabromobisphenol and a mixture of about 40 to 80% by weight isophthaloyl chloride and correspondingly about 60 to 20% by weight terephthaloyl chloride.

14. The process according to claim 12 wherein said halogenated aromatic polyester of the recurring structural formula is a product of tetrabromobisphenol A and a mixture of about 60% by weight isophthaloyl chloride and correspondingly about 40% by weight terephthaloyl chloride.

15. The process according to claim 12 wherein said halogenated aromatic polyester of the recurring structural formula is a product of a tetrachlorobisphenol and a mixture of about 90 to 40% by weight isophthaloyl chloride and correspondingly about 10 to 60% by weight terephthaloyl chloride.

16. The process according to claim 12 wherein said halogenated aromatic polyester of the recurring structural formula is a product of tetrachlorobisphenol A and a mixture of about 70% by weight isophthaloyl chloride and correspondingly about 30% by weight terephthaloyl chloride.

17. The process of claim 12 wherein the phase transfer catalyst is selected from the group consisting of quaternary ammonium salts, quaternary phosphonium salts, quaternary arsonium salts and tertiary sulfonium salts.

18. The process of claim 12 wherein the phase transfer catalyst is benzyltriethylammonium chloride.

19. The process of claim 12 wherein the halogenated aromatic polyester of the recurring structural formula has an intrinsic viscosity of about 0.8 to about 1.2.

20. A process for preparing a brominated aromatic polyester of the recurring structural formula

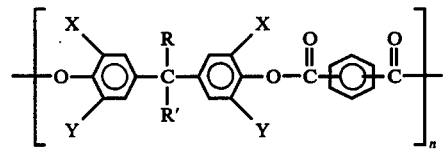

wherein X and Y are bromine, R and R' may be the same or different and represent lower alkyl groups, hydrogen, or together constitute a cyclic hydrocarbon group, and n equals at least 13, by the inverse interfacial polymerization of a brominated bisphenol and a mixture of isophthaloyl chloride and terephthaloyl chloride which comprises
I. providing an organic phase comprising
  a. methylene chloride,
  b. a 60:40 mixture of isophthaloyl and terephthaloyl chloride,
  c. a catalytic amount of benzyltriethylammonium chloride;
II. providing an aqueous phase comprising
  a. water,
  b. an alkali salt of said brominated bisphenol,
  c. sodium hydroxide in an amount sufficient to establish a pH of said aqueous phase of at least 8;
III. gradually adding the aqueous phase to the organic phase at a rate of about 1 to about 10 mole percent per minute based on the total number of moles of the bisphenol salt originally present in the aqueous phase prior to addition;
IV. recovering the resulting polyester product.

21. A process for preparing a halogenated aromatic polyester according to claim 1 wherein n of said recurring structural formula is about 40 to 400.

22. A process for preparing a halogenated aromatic polyester according to claim 12 wherein n of said recurring structural formula is about 40 to 400.

23. A process for preparing a brominated aromatic polyester according to claim 20 wherein n of said recurring structural formula is about 40 to 400.

* * * * *